(12) United States Patent
Hurst et al.

(10) Patent No.: US 12,164,933 B2
(45) Date of Patent: *Dec. 10, 2024

(54) DYNAMICALLY REORDERING PLUGIN EXECUTION ORDER AT AN API GATEWAY OF A MICROSERVICES APPLICATION

(71) Applicant: KONG INC., San Francisco, CA (US)

(72) Inventors: James Hurst, Oporto (PT); Joshua Schmid, Nuremberg (DE); Shane Connelly, San Rafael, CA (US); Aapo Talvensaari, Vantaa (FI); Enrique Garcia Cota, Madrid (ES); Harry Bagdi, Seattle, WA (US); Rob Serafini, San Francisco, CA (US)

(73) Assignee: KONG INC., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/484,735

(22) Filed: Oct. 11, 2023

(65) Prior Publication Data

US 2024/0126566 A1 Apr. 18, 2024

Related U.S. Application Data

(63) Continuation of application No. 18/052,494, filed on Nov. 3, 2022, now Pat. No. 11,829,784, which is a
(Continued)

(51) Int. Cl.
*G06F 9/54* (2006.01)
*G06F 9/445* (2018.01)
(Continued)

(52) U.S. Cl.
CPC ........ *G06F 9/44526* (2013.01); *G06F 9/4881* (2013.01); *G06F 9/5038* (2013.01); *G06F 9/541* (2013.01); *G06F 9/547* (2013.01)

(58) Field of Classification Search
CPC .... G06F 9/44526; G06F 9/4881; G06F 9/547; G06F 9/541; G06F 9/54
See application file for complete search history.

(56) References Cited

U.S. PATENT DOCUMENTS 10,613,878 B2   4/2020  Mathur et al.
11,520,605 B1*  12/2022 Hurst ...................... G06F 9/547
(Continued)

OTHER PUBLICATIONS

TieskeE , "Kong/ priority-updater", Tieske, "Kong/ priority-updater" (May 4, 2021), pp. 1-4 [retrieved from https://github.com/Kong/priority-updater]. (Year: 2021).

*Primary Examiner* — Brian W Wathen
(74) *Attorney, Agent, or Firm* — Perkins Coie LLP; Colin Fowler

(57) ABSTRACT

Disclosed embodiments are directed at systems, methods, and architecture for providing execution order and execution for plugins installed on an API gateway associated with a microservices application. In application architectures where features of microservices are implemented as plugins and migrated to an API gateway, the relevant APIs are able to be built lighter weight than otherwise. However, the migration of the features to plugins introduces the potential for error states in the microservice application. To resolve the potential issues, the API gateway takes into consideration a set of native instructions in each of the plugins to determine the execution order thereof. The execution order is determined dynamically in response to requests by the APIs of the microservice application.

20 Claims, 16 Drawing Sheets

Related U.S. Application Data continuation of application No. 17/804,046, filed on May 25, 2022, now Pat. No. 11,520,605.

(51) Int. Cl.
    *G06F 9/48*     (2006.01)
    *G06F 9/50*     (2006.01)

(56) References Cited

U.S. PATENT DOCUMENTS

| | | | |
|---|---|---|---|
| 11,829,784 B1* | 11/2023 | Hurst | G06F 9/547 |
| 2013/0169987 A1 | 7/2013 | Akiyama | |
| 2014/0351817 A1 | 11/2014 | Sawamura | |
| 2019/0034210 A1 | 1/2019 | Palladino et al. | |
| 2020/0409671 A1* | 12/2020 | Mazurskiy | G06F 8/36 |
| 2021/0056474 A1 | 2/2021 | Tanaka | |
| 2021/0075700 A1* | 3/2021 | Palladino | H04L 47/74 |
| 2022/0224535 A1 | 7/2022 | Coffing | |
| 2022/0278900 A1* | 9/2022 | Pieczul | H04L 41/22 |
| 2022/0291973 A1* | 9/2022 | Wangde | G06F 9/5055 |

\* cited by examiner (DISTRIBUTED API GATEWAY)

DYNAMICALLY REORDERING PLUGIN EXECUTION ORDER AT AN API GATEWAY OF A MICROSERVICES APPLICATION

CROSS-REFERENCE TO RELATED APPLICATION

This application is continuation of U.S. application Ser. No. 18/052,494, filed on Nov. 3, 2022, which is a continuation of U.S. application Ser. No. 17/804,046, filed on May 25, 2022, now U.S. Pat. No. 11,520,605, the contents of which are incorporated herein by reference in their entireties.

BACKGROUND

Application programming interfaces (APIs) are specifications primarily used as an interface platform by software components to enable communication with each other. For example, APIs can include specifications for clearly defined routines, data structures, object classes, and variables. Thus, an API defines what information is available and how to send or receive that information.

Microservices are a software development technique-a variant of the service-oriented architecture (SOA) architectural style that structures an application as a collection of loosely coupled services (embodied in APIs). In a microservices architecture, services are fine-grained and the protocols are lightweight. The benefit of decomposing an application into different smaller services is that it improves modularity. This makes the application easier to understand, develop, test, and become more resilient to architecture erosion. Microservices parallelize development by enabling small autonomous teams to develop, deploy, and scale their respective services independently. Microservice-based architectures enable continuous delivery and deployment.

Setting up multiple APIs is a time-consuming challenge. This is because deploying an API requires tuning the configuration or settings of each API individually. The functionalities of each individual API are confined to that specific API and servers hosting multiple APIs are individually set up for hosting the APIs, this makes it very difficult to build new APIs or even scale and maintain existing APIs. This becomes even more challenging when there are tens of thousands of APIs and millions of clients requesting API-related services per day. Consequently, visualizing these APIs is a tedious and cumbersome activity.

DETAILED DESCRIPTION

Figure 1A:
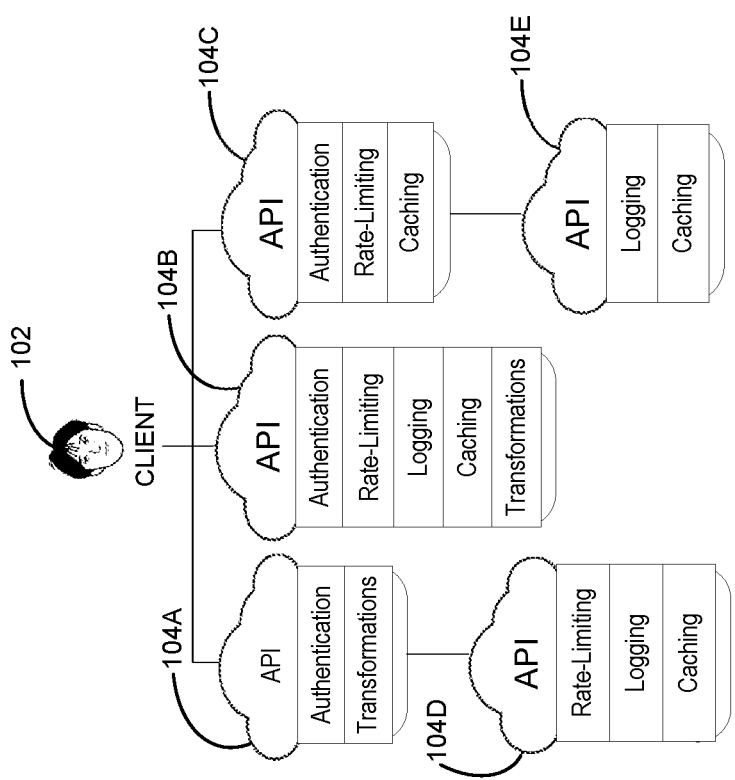
FIG. 1A illustrates a prior art approach with multiple APIs having functionalities common to one another.

The disclosed technology describes how to dynamically reorder or configure plugin features on an API gateway based on plugin native instructions. The plugin native instructions indicate a preference of execution order and/or a preference of execution conditions. The API gateway explicitly takes the plugin native instructions into account when executing those plugins. For purposes of this application, the terms API gateway and gateway node both refer to a gateway that acts as the primary entry point to a microservices application.

In network routing and microservices applications, the API gateway and control plane are the part of the router architecture that is concerned with drawing the network topology, or the routing table that defines what to do with incoming packets. Control plane logic also can define certain packets to be discarded, as well as preferential treatment of certain packets for which a high quality of service is defined by such mechanisms as differentiated services.

In monolithic application architecture, a control plane operates outside the core application. In a microservices architecture, the control plane operates between each API that makes up the microservice architecture. Proxies operate linked to each API. The proxy attached to each API is referred to as a "data plane proxy." Examples of a data plane proxy include the sidecar proxies of Envoy proxies.

The generation or updates of documentation are implemented in a number of ways and based on a number of behavioral indicators described herein.

The following description and drawings are illustrative and are not to be construed as limiting. Numerous specific details are described to provide a thorough understanding of the disclosure. However, in certain instances, well-known or conventional details are not described in order to avoid obscuring the description. References to an embodiment in the present disclosure can be, but not necessarily are, references to the same embodiment; and, such references mean at least one of the embodiments.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example, using italics and/or quotation marks. The use of highlighting has no influence on the scope and meaning of a term; the scope and meaning of a term is the same, in the same context, whether or not it is highlighted. It will be appreciated that the same thing can be said in more than one way.

Consequently, alternative language and synonyms may be used for any one or more of the terms discussed herein, and no special significance should be placed upon whether or not a term is elaborated or discussed herein. Synonyms for certain terms are provided. A recital of one or more synonyms does not exclude the use of other synonyms. The use of examples anywhere in this specification, including examples of any terms discussed herein, is illustrative only and is not intended to further limit the scope and meaning of the disclosure or of any exemplified term. Likewise, the disclosure is not limited to various embodiments given in this specification.

Without intent to further limit the scope of the disclosure, examples of instruments, apparatus, methods, and their related results according to the embodiments of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions, will control.

Embodiments of the present disclosure are directed at systems, methods, and architecture for providing microservices and a plurality of APIs to requesting clients. The architecture is a distributed cluster of gateway nodes that jointly provide microservices and the plurality of APIs. Providing the APIs includes providing a plurality of plugins that implement the APIs. As a result of a distributed architecture, the task of API management can be distributed across a cluster of gateway nodes. Every request being made to an API hits a gateway node first, and then the request is proxied to the target API. The gateway nodes effectively become the entry point for every API-related request. The disclosed embodiments are well-suited for use in mission critical deployments at small and large organizations. Aspects of the disclosed technology do not impose any limitation on the type of APIs. For example, these APIs can be proprietary APIs, publicly available APIs, or invite-only APIs.

FIG. 1A illustrates a prior art approach with multiple APIs having functionalities common to one another. As shown in FIG. 1A, a client 102 is associated with APIs 104A, 104B, 104C, 104D, and 104E. Each API has a standard set of features or functionalities associated with it. For example, the standard set of functionalities associated with API 104A are "authentication" and "transformations." The standard set of functionalities associated with API 104B are "authentication," "rate limiting," "logging," "caching," and "transformations." Thus, "authentication" and "transformations" are functionalities that are common to APIs 104A and 104B. Similarly, several other APIs in FIG. 1A share common functionalities. However, it is noted that having each API handle its own functionalities individually causes duplication of efforts and code associated with these functionalities, which is inefficient. This problem becomes significantly more challenging when there are tens of thousands of APIs and millions of clients requesting API-related services per day.

Figure 1B:
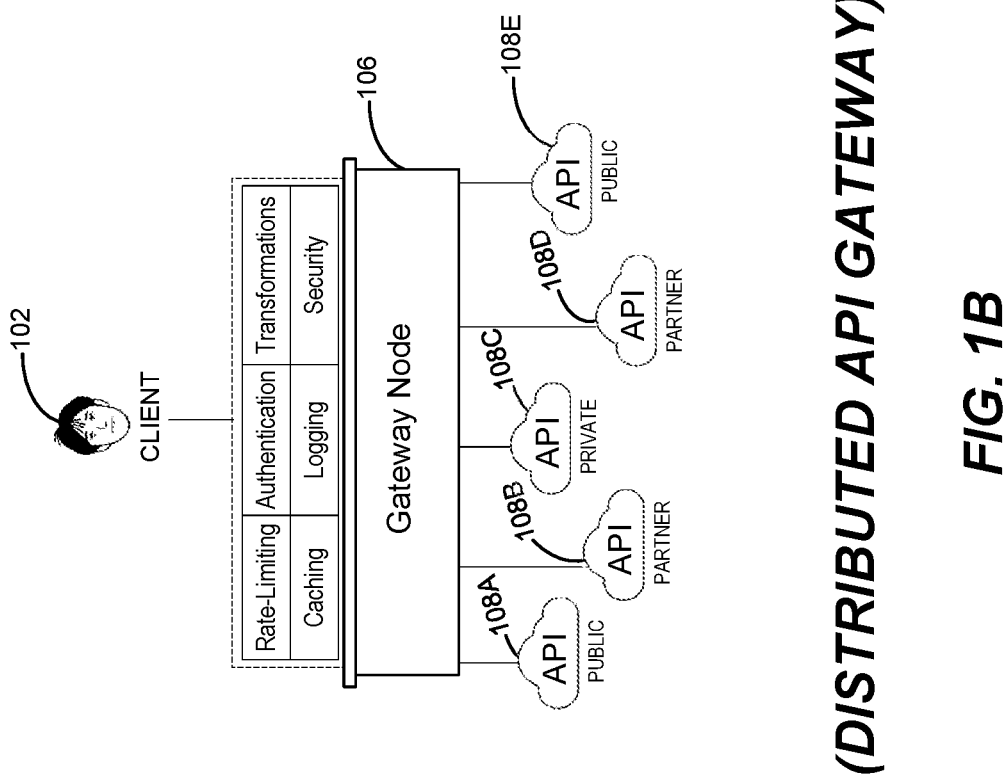
FIG. 1B illustrates a distributed API gateway architecture, according to an embodiment of the disclosed technology.

FIG. 1B illustrates a distributed API gateway architecture according to an embodiment of the disclosed technology. To address the challenge described in connection with FIG. 1A, the disclosed technology provides a distributed API gateway architecture as shown in FIG. 1B. Specifically, disclosed embodiments implement common API functionalities by bundling the common API functionalities into a gateway node 106 (also referred to herein as an API gateway). Gateway node 106 implements common functionalities as a core set of functionalities that runs in front of APIs 108A, 108B, 108C, 108D, and 108E. The core set of functionalities include rate limiting, caching, authentication, logging, transformations, and security. It will be understood that the above-mentioned core set of functionalities are for examples and illustrations. There can be other functionalities included in the core set of functionalities besides those discussed in FIG. 1B. In some applications, gateway node 106 can help launch large-scale deployments in a very short time at reduced complexity and is therefore an inexpensive replacement for expensive proprietary API management systems. The disclosed technology includes a distributed architecture of gateway nodes with each gateway node bundled with a set of functionalities that can be extended depending on the use-case or applications.

Figure 2:
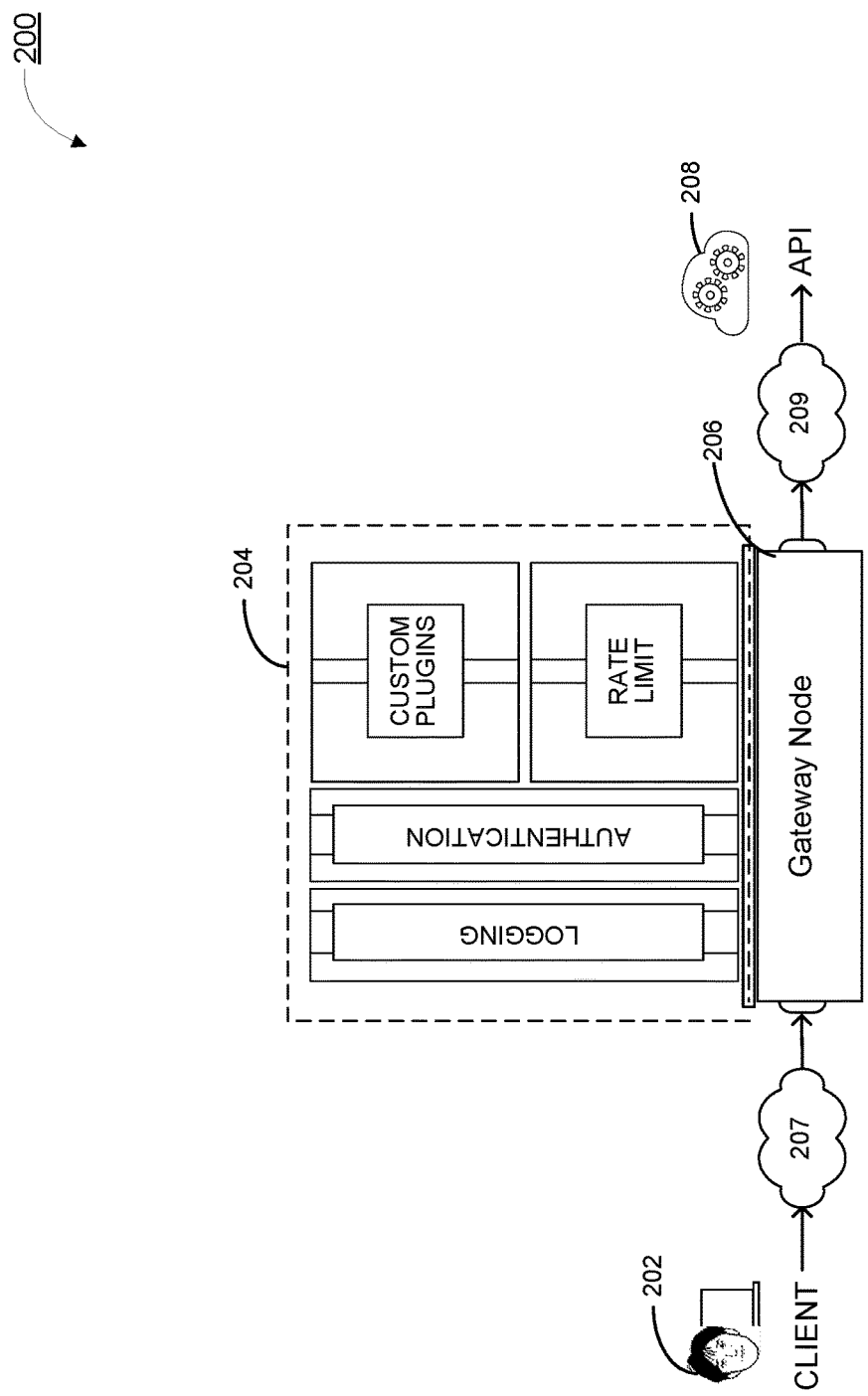
FIG. 2 illustrates a block diagram of an example environment suitable for functionalities provided by a gateway node, according to an embodiment of the disclosed technology.

FIG. 2 illustrates a block diagram of an example environment suitable for functionalities provided by a gateway node according to an embodiment of the disclosed technology. In some embodiments, a core set of functionalities are provided in the form of "plugins" or "add-ons" installed at a gateway node. (Generally, a plugin is a component that allows modification of what a system can do usually without forcing a redesign/compile of the system. When an application supports plugins, it enables customization. The common examples are the plugins used in web browsers to add new features, such as search-engines, virus scanners, or the ability to utilize a new file type such as a new video format.)

As an example, a set of plugins 204 shown in FIG. 2 are provided by gateway node 206 positioned between a client 202 and one or more HTTP APIs. Electronic devices operated by client 202 can include, but are not limited to, a server desktop, a desktop computer, a computer cluster, a mobile computing device such as a notebook, a laptop computer, a handheld computer, a mobile phone, a smart phone, a personal digital assistant (PDA), an Android™ device, and/or an iPhone™. Gateway node 206 and client 202 are configured to communicate with each other via network 207. Gateway node 206 and one or more APIs 208 are configured to communicate with each other via network 209. In some embodiments, the one or more APIs reside in one or more API servers, API data stores, or one or more API hubs. Various combinations of configurations are possible.

Networks 207 and 209 can be any collection of distinct networks operating wholly or partially in conjunction to provide connectivity to/from client 202 and one or more APIs 208. In one embodiment, network communications can be achieved by an open network, such as the Internet, or a private network, such as an intranet and/or the extranet. Networks 207 and 209 can be a telephonic network, an open network, such as the Internet, or a private network, such as an intranet and/or the extranet. For example, the Internet can provide file transfer, remote login, email, news, RSS, and other services through any known or convenient protocol, such as, but not limited to, the TCP/IP protocol, Open System Interconnections (OSI), FTP, UPnP, iSCSI, NSF, ISDN, PDH, RS-232, SDH, SONET, etc.

Client 202 and one or more APIs 208 can be coupled to the network 150 (e.g., Internet) via a dial-up connection, a digital subscriber loop (DSL, ADSL), cable modem, wireless connections, and/or other types of connection. Thus, the client devices 102A-N, 112A-N, and 122A-N can communicate with remote servers (e.g., API servers 130A-N, hub servers, mail servers, instant messaging servers, etc.) that provide access to user interfaces of the World Wide Web via a web browser, for example.

The set of plugins 204 include authentication, logging, rate limiting, and custom plugins, of which authentication, logging, traffic control, and rate limiting can be considered as the core set of functionalities. An authentication functionality can allow an authentication plugin to check for valid login credentials, such as usernames and passwords. A logging functionality of a logging plugin logs data associated with requests and responses. A traffic control functionality of a traffic control plugin manages, throttles, and restricts inbound and outbound API traffic. A rate limiting functionality can allow managing, throttling, and restricting inbound and outbound API traffic. For example, a rate limiting plugin can determine how many HTTP requests a developer can make in a given period of seconds, minutes, hours, days, months, or years.

A plugin can be regarded as a piece of standalone code. After a plugin is installed at a gateway node, it is available to be used. For example, gateway node 206 can execute a plugin in between an API-related request and providing an associated response to the API-related request. One advantage of the disclosed system is that the system can be expanded by adding new plugins. In some embodiments, gateway node 206 can expand the core set of functionalities by providing custom plugins. Custom plugins can be provided by the entity that operates the cluster of gateway nodes. In some instances, custom plugins are developed (e.g., built from "scratch") by developers or any user of the disclosed system. It can be appreciated that plugins, used in accordance with the disclosed technology, facilitate in centralizing one or more common functionalities that would be otherwise distributed across the APIs, making it harder to build, scale, and maintain the APIs of the microservice application.

Other examples of plugins can be a security plugin, a monitoring and analytics plugin, and a transformation plugin. A security functionality can be associated with the system restricting access to an API by whitelisting or blacklisting/whitelisting one or more consumers identified, for example, in one or more access control lists (ACLs). In some embodiments, the security plugin requires an authentication plugin to be enabled on an API. In some use cases, a request sent by a client can be transformed or altered before being sent to an API. A transformation plugin can apply a transformations functionality to alter the request sent by a client. In many use cases, a client might wish to monitor request and response data. A monitoring and analytics plugin can allow monitoring, visualizing, and inspecting APIs and microservices traffic.

In some embodiments, a plugin is Lua code that is executed during the life-cycle of a proxied request and response. Through plugins, functionalities of a gateway node can be extended to fit any custom need or integration challenge. For example, if a consumer of the disclosed system needs to integrate their API's user authentication with a third-party enterprise security system, it can be implemented in the form of a dedicated (custom) plugin that is run on every request targeting that given API. One advantage, among others, of the disclosed system is that the distributed cluster of gateway nodes is scalable by simply adding more nodes, implying that the system can handle virtually any load while keeping latency low.

One advantage of the disclosed system is that it is platform agnostic, which implies that the system can run anywhere. In one implementation, the distributed cluster can be deployed in multiple data centers of an organization. In some implementations, the distributed cluster can be deployed as multiple nodes in a cloud environment. In some implementations, the distributed cluster can be deployed as a hybrid setup involving physical and cloud computers. In some other implementations, the distributed cluster can be deployed as containers.

Figure 3A:
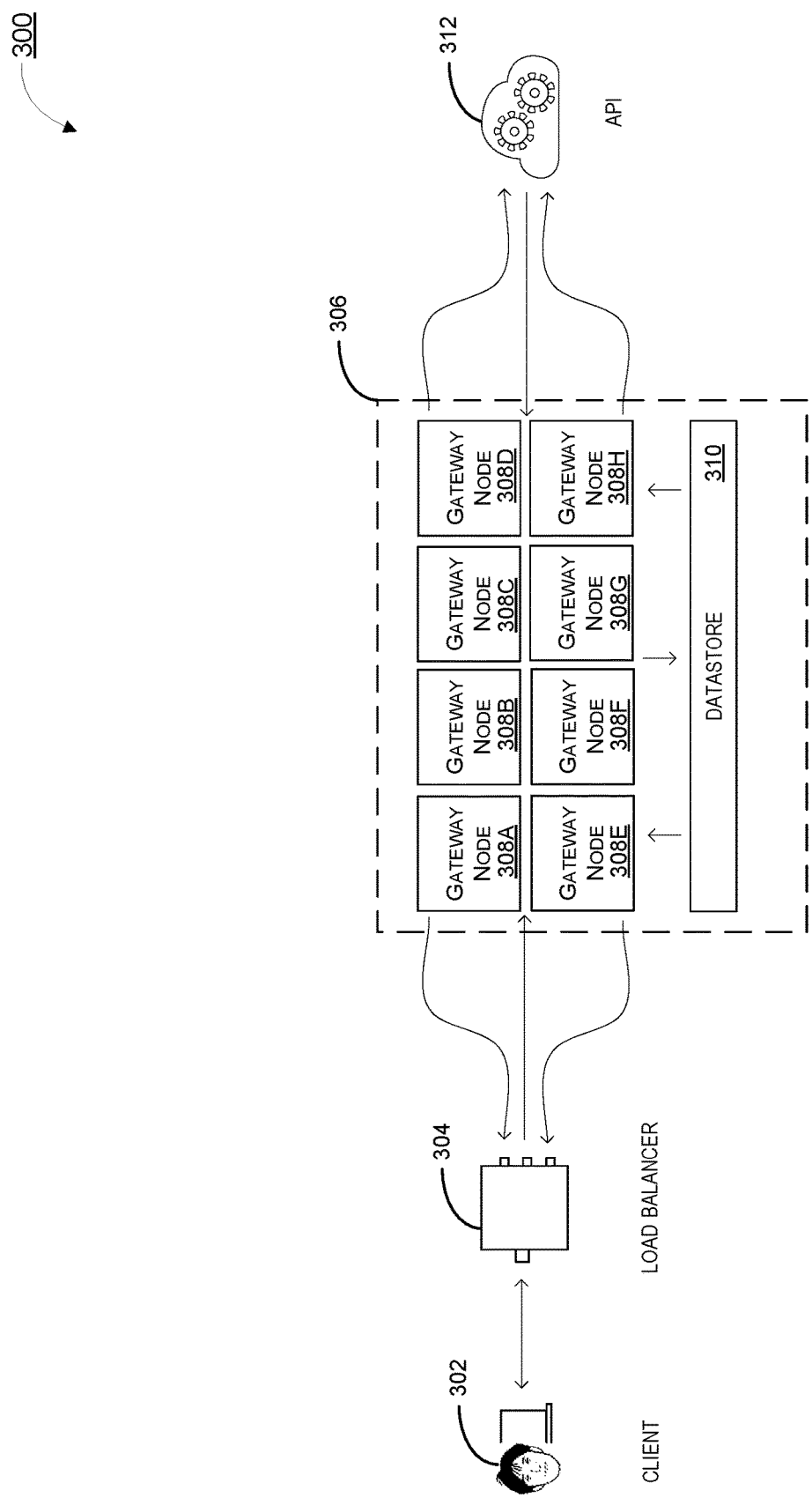
FIG. 3A illustrates a block diagram of an example environment with a cluster of gateway nodes in operation, according to an embodiment of the disclosed technology.

FIG. 3A illustrates a block diagram of an example environment with a cluster of gateway nodes in operation. In some embodiments, a gateway node is built on top of NGINX. NGINX is a high-performance, highly-scalable, highly-available web server, reverse proxy server, and web accelerator (combining the features of an HTTP load balancer, content cache, and other features). In an example deployment, a client 302 communicates with one or more APIs 312 via load balancer 304, and a cluster of gateway nodes 306. The cluster of gateway nodes 306 can be a distributed cluster. The cluster of gateway nodes 306 includes gateway nodes 308A-308H and data store 310. The functions represented by the gateway nodes 308A-308H and/or the data store 310 can be implemented individually or in any combination thereof, partially or wholly, in hardware, software, or a combination of hardware and software.

Load balancer 304 provides functionalities for load balancing requests to multiple backend services. In some embodiments, load balancer 304 can be an external load balancer. In some embodiments, the load balancer 304 can be a DNS-based load balancer. In some embodiments, load balancer 304 can be a Kubernetes® load balancer integrated within the cluster of gateway nodes 306.

Data store 310 stores all the data, routing information, plugin configurations, etc. Examples of a data store can be Apache Cassandra or PostgreSQL. In accordance with disclosed embodiments, multiple gateway nodes in the cluster share the same data store, e.g., as shown in FIG. 3A. Because multiple gateway nodes in the cluster share the same data store, there is no requirement to associate a specific gateway node with the data store-data from each gateway node 308A-308H is stored in data store 310 and retrieved by the other nodes (e.g., even in complex multiple data center setups). In some embodiments, the data store shares configurations and software codes associated with a plugin that is installed at a gateway node. In some embodiments, the plugin configuration and code can be loaded at runtime.

Figure 3B:
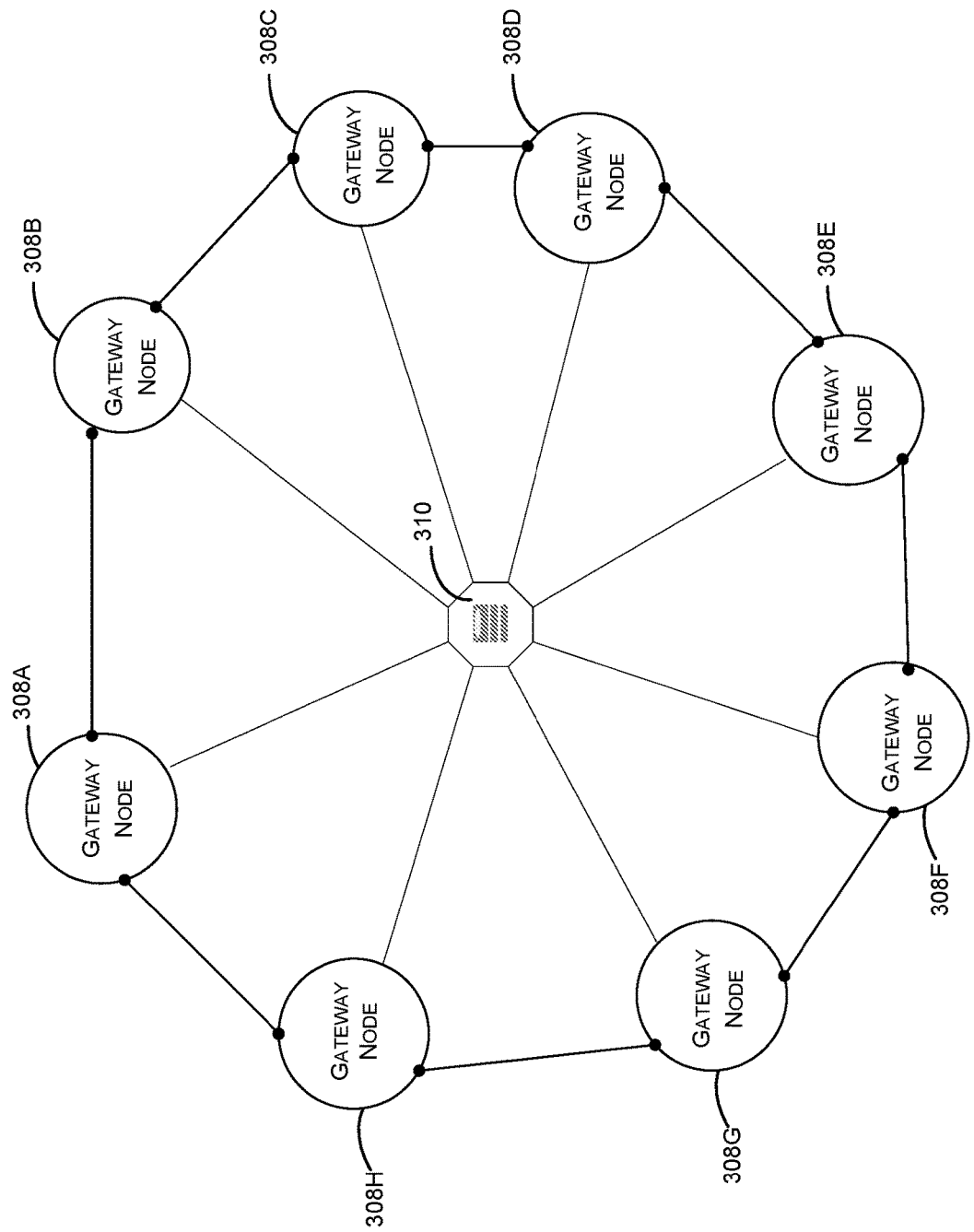
FIG. 3B illustrates a schematic of a data store shared by multiple gateway nodes, according to an embodiment of the disclosed technology.

FIG. 3B illustrates a schematic of a data store shared by multiple gateway nodes, according to an embodiment of the disclosed technology. For example, FIG. 3B shows data store 310 shared by gateway nodes 308A-308H arranged as part of a cluster.

One advantage of the disclosed architecture is that the cluster of gateway nodes allow the system to be scaled horizontally by adding more gateway nodes to encompass a bigger load of incoming API-related requests. Each of the gateway nodes share the same data since they point to the same data store. The cluster of gateway nodes can be created in one datacenter, or in multiple datacenters distributed across different geographical locations, in both cloud or on-premise environments. In some embodiments, gateway nodes (e.g., arranged according to a flat network topology) between the datacenters communicate over a virtual private network (VPN) connection. The system can automatically handle a new gateway node joining a cluster or leaving a cluster. Once a gateway node communicates with another gateway node, it will automatically discover all the other gateway nodes due to an underlying gossip protocol.

In some embodiments, each gateway includes an administration API (e.g., internal RESTful API) for administration purposes. Requests to the administration API can be sent to any node in the cluster. The administration API can be a generic HTTP API. Upon setup, each gateway node is associated with a consumer port and an admin port that manages the API-related requests coming into the consumer port. For example, port number 8001 is the default port on which the administration API listens and 8444 is the default port for HTTPS (e.g., admin_listen_ssl) traffic to the administration API.

In some instances, the administration API can be used to provision plugins. After a plugin is installed at a gateway node, it is available to be used (e.g., by the administration API or a declarative configuration).

In some embodiments, the administration API identifies a status of a cluster based on a health state of each gateway node. For example, a gateway node can be in one of the following states:

active: the node is active and part of the cluster.
failed: the node is not reachable by the cluster.
leaving: a node is in the process of leaving the cluster.
left: the node has left the cluster.

In some embodiments, the administration API is an HTTP API available on each gateway node that allows the user to create, restore, update, and delete (CRUD) operations on items (e.g., plugins) stored in the data store. For example, the Admin API can provision APIs on a gateway node, provision plugin configuration, create consumers, and provision their credentials. In some embodiments, the administration API can also read, update, or delete the data. Generally, the administration API can configure a gateway node and the data associated with the gateway node in the data store.

In some applications, it is possible that the data store only stores the configuration of a plugin and not the software code of the plugin. That is, for installing a plugin at a gateway node, the software code of the plugin is stored on that gateway node. This can result in efficiencies because the user needs to update his or her deployment scripts to include the new instructions that would install the plugin at every gateway node. The disclosed technology addresses this issue by storing both the plugin and the configuration of the plugin. By leveraging the administration API, each gateway node can not only configure the plugins, but also install them.

Thus, one advantage of the disclosed system is that a user does not have to install plugins at every gateway node. But rather, the administration API associated with one of the gateway nodes automates the task of installing the plugins at gateway nodes by installing the plugin in the shared data store, such that every gateway node can retrieve the plugin code and execute the code for installing the plugins. Because the plugin code is also saved in the shared data store, the code is effectively shared across the gateway nodes by leveraging the data store, and does not have to be individually installed on every gateway node.

Figure 4A:
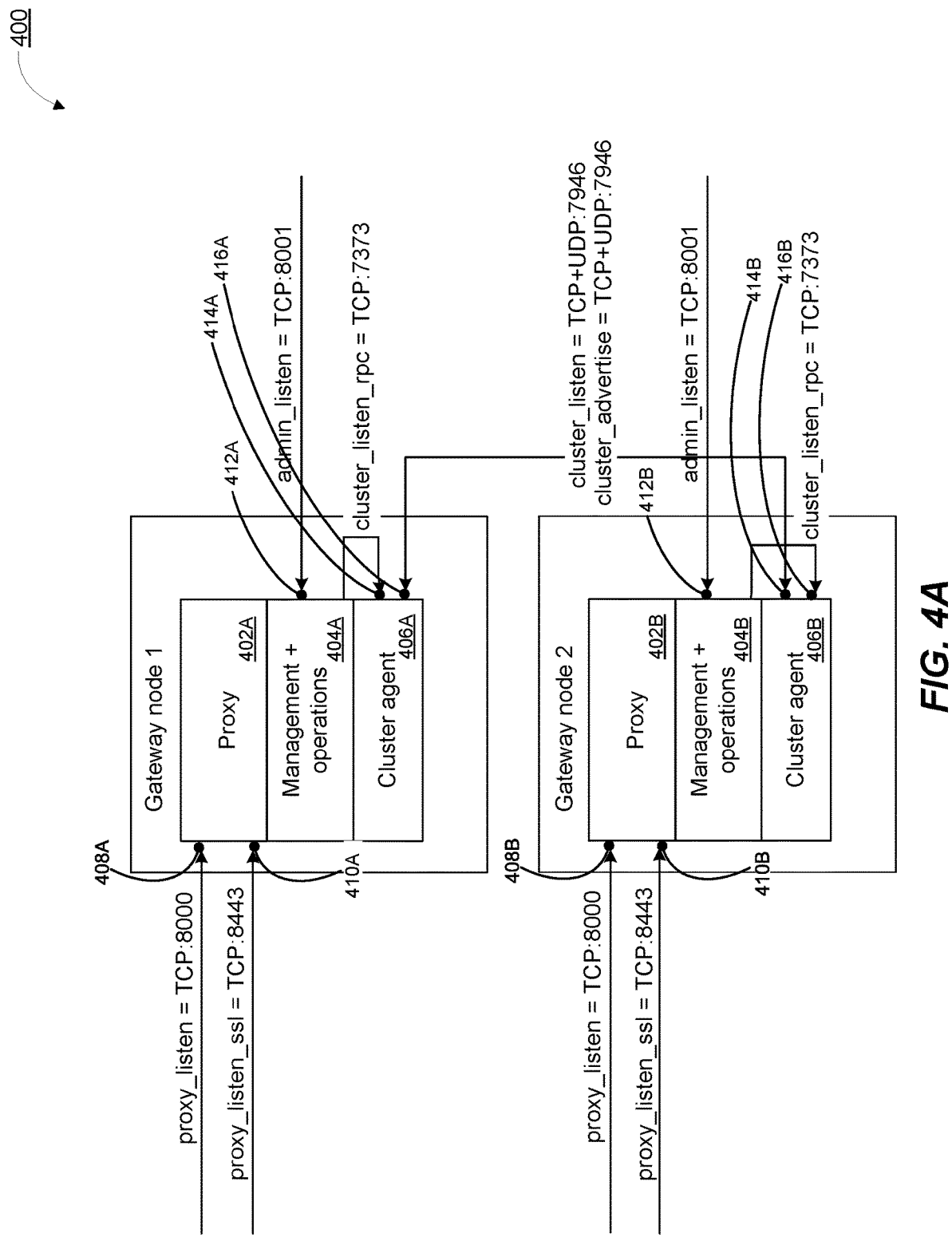
FIG. 4A and FIG. 4B illustrate example ports and connections of a gateway node, according to an embodiment of the disclosed technology.
Figure 4B:
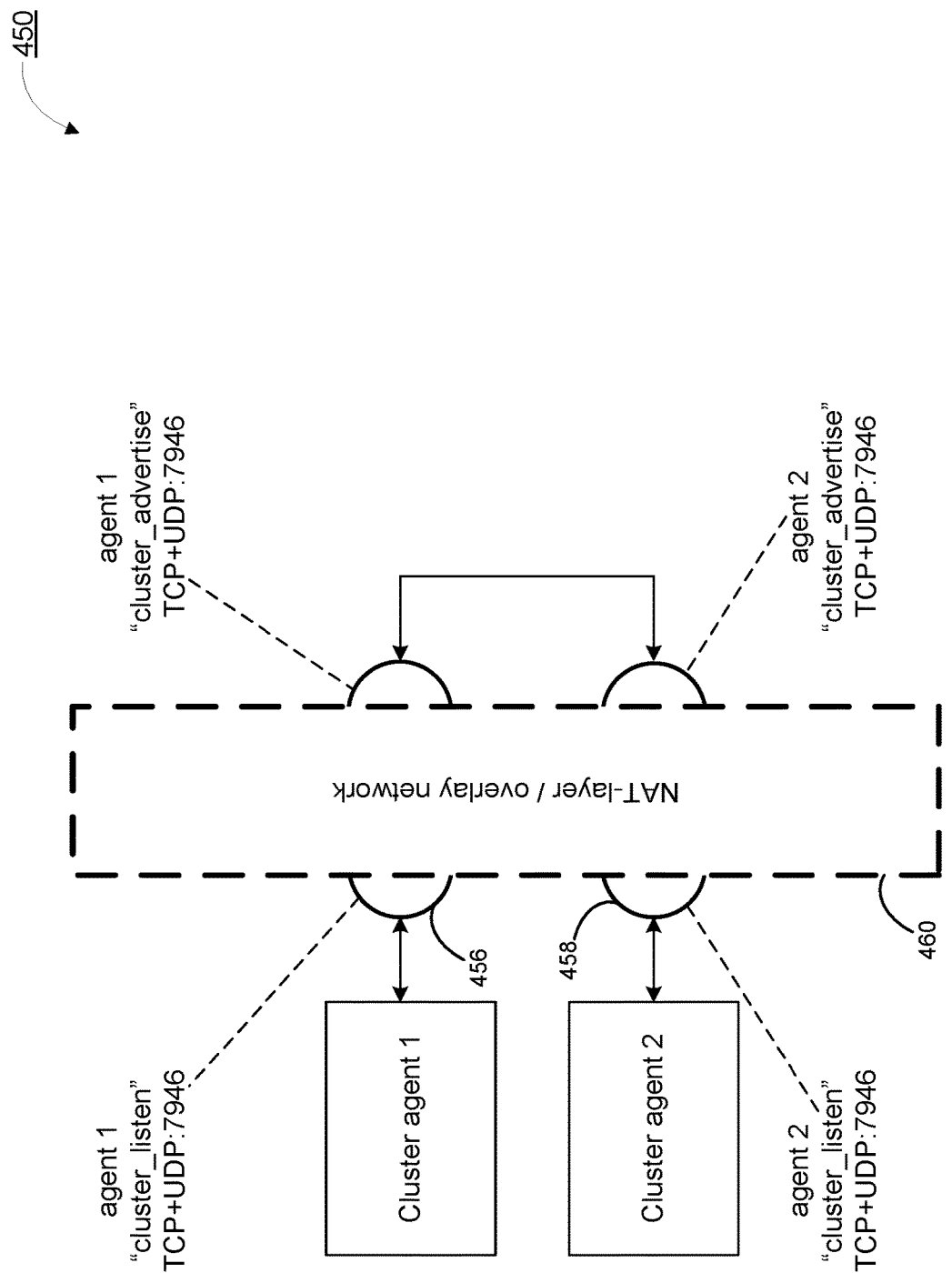

FIG. 4A and FIG. 4B illustrate example block diagrams 400 and 450 showing ports and connections of a gateway node, according to an embodiment of the disclosed technology. Specifically, FIG. 4A shows a gateway node 1 and gateway node 2. Gateway node 1 includes a proxy module 402A, a management and operations module 404A, and a cluster agent module 406A. Gateway node 2 includes a proxy module 402B, a management and operations module 404B, and a cluster agent module 406B. Gateway node 1 receive incoming traffic at ports denoted as 408A and 410A. Ports 408A and 410A are coupled to proxy module 402B. Gateway node 1 listens for HTTP traffic at port 408A. The default port number for port 408A is 8000. API-related requests are typically received at port 408A. Port 410A is used for proxying HTTPS traffic. The default port number for port 410A is 8443. Gateway node 1 exposes its administration API (alternatively, referred to as management API) at port 412A that is coupled to management and operations module 404A. The default port number for port 412A is 8001.

The administration API allows configuration and management of a gateway node, and is typically kept private and secured. Gateway node 1 allows communication within itself (i.e., intra-node communication) via port 414A that is coupled to clustering agent module 406A. The default port number for port 414A is 7373. Because the traffic (e.g., TCP traffic) here is local to a gateway node, this traffic does not need to be exposed. Cluster agent module 406B of gateway node 1 enables communication between gateway node 1 and other gateway nodes in the cluster. For example, ports 416A and 416B, coupled with cluster agent module 406A at gateway node 1 and cluster agent module 406B at gateway node 2, allow intra-cluster or inter-node communication. Intra-cluster communication can involve UDP and TCP traffic. Both ports 416A and 416B have the default port number set to 7946.

In some embodiments, a gateway node automatically (e.g., without human intervention) detects its ports and addresses. In some embodiments, the ports and addresses are advertised (e.g., by setting the cluster_advertise property/setting to a port number) to other gateway nodes. It will be understood that the connections and ports (denoted with the numeral "B") of gateway node 2 are similar to those in gateway node 1, and hence is not discussed herein.

FIG. 4B shows cluster agent 1 coupled to port 456 and cluster agent 2 coupled to port 458. Cluster agent 1 and cluster agent 2 are associated with gateway node 1 and gateway node 2, respectively. Ports 456 and 458 are communicatively connected to one another via an NAT-layer 460. In accordance with disclosed embodiments, gateway nodes are communicatively connected to one another via a NAT-layer. In some embodiments, there is no separate cluster agent but the functionalities of the cluster agent are integrated into the gateway nodes. In some embodiments, gateway nodes communicate with each other using the explicit IP address of the nodes.

Figure 5:
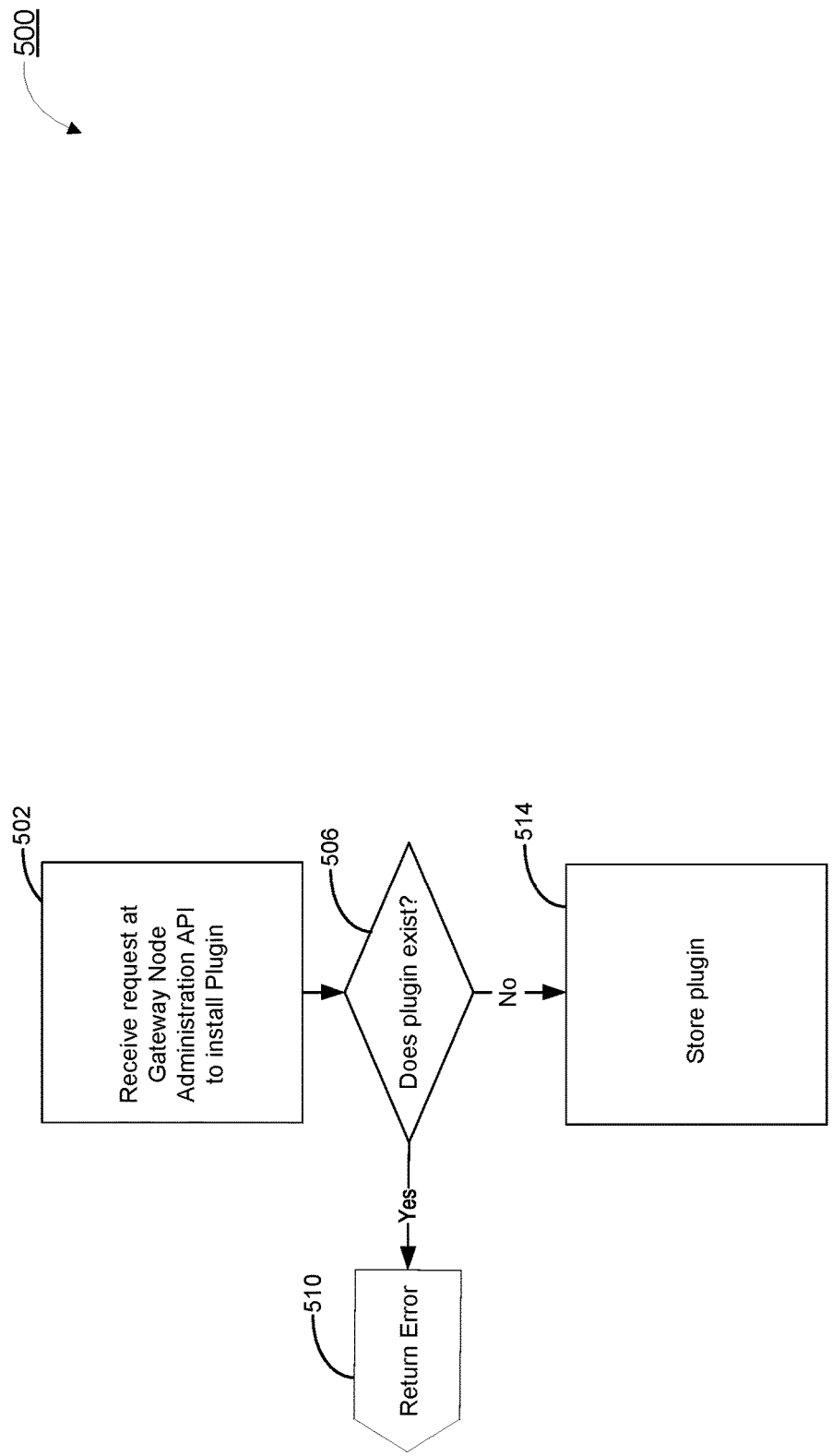
FIG. 5 illustrates a flow diagram showing steps involved in the installation of a plugin at a gateway node, according to an embodiment of the disclosed technology.

FIG. 5 illustrates a flow diagram showing steps of a process 500 involved in installation of a plugin at a gateway node, according to an embodiment of the disclosed technology. At step 502, the administration API of a gateway node receives a request to install a plugin. An example of a request is provided below:

For example:
POST/plugins/install
name=OPTIONAL_VALUE
code=VALUE
archive=VALUE

The administration API of the gateway node determines (at step 506) if the plugin exists in the data store. If the gateway node determines that the plugin exists in the data store, then the process returns (at step 510) an error. If the gateway node determines that the plugin does not exist in the data store, then the process stores the plugin. (In some embodiments, the plugin can be stored in an external data store coupled to the gateway node, a local cache of the gateway node, or a third party storage. For example, if the plugin is stored at some other location besides the data store, then different policies can be implemented for accessing the plugin.) Because the plugin is now stored in the database, it is ready to be used by any gateway node in the cluster.

When a new API request goes through a gateway node (in the form of network packets), the gateway node determines (among other things) which plugins are to be loaded. Therefore, a gateway node sends a request to the data store to retrieve the plugin(s) that has/have been configured on the API and that need(s) to be executed. The gateway node communicates with the data store using the appropriate database driver (e.g., Cassandra or PostgresSQL) over a TCP communication. In some embodiments, the gateway node retrieves both the plugin code to execute and the plugin configuration to apply for the API, and then execute them at runtime on the gateway node (e.g., as explained in FIG. 6).

Figure 6:
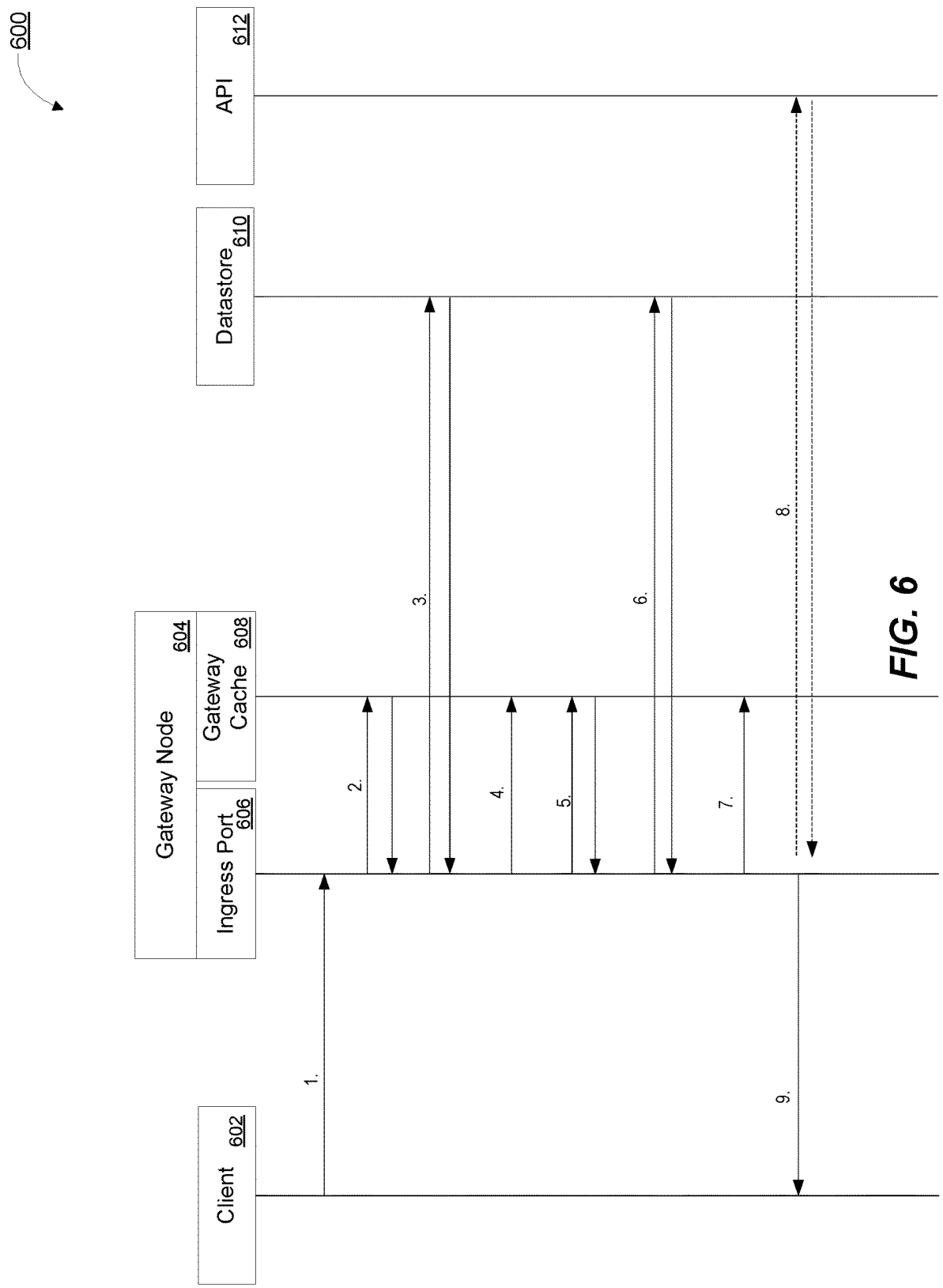
FIG. 6 illustrates a sequence diagram showing components and associated steps involved in loading configurations and code at runtime, according to an embodiment of the disclosed technology.

FIG. 6 illustrates a sequence diagram 600 showing components and associated steps involved in loading configurations and code at runtime, according to an embodiment of the disclosed technology. The components involved in the interaction are client 602, gateway node 604 (including an ingress port 606 and a gateway cache 608), data store 610, and an API 612. At step 1, a client makes a request to gateway node 604. At step 2, ingress port 606 of gateway node 604 checks with gateway cache 608 to determine if the plugin information and the information to process the request has already been cached previously in gateway cache 608. If the plugin information and the information to process the request is cached in gateway cache 608, then the gateway cache 608 provides such information to the ingress port 606. If, however, the gateway cache 608 informs the ingress port 606 that the plugin information and the information to process the request is not cached in gateway cache 608, then the ingress port 606 loads (at step 3) the plugin information and the information to process the request from data store 610. In some embodiments, ingress port 606 caches (for subsequent requests) the plugin information and the information to process the request (retrieved from data store 610) at gateway cache 608. At step 5, ingress port 606 of gateway node 604 executes the plugin and retrieves the plugin code from the cache, for each plugin configuration. However, if the plugin code is not cached at the gateway cache 608, the gateway node 604 retrieves (at step 6) the plugin code from data store 610 and caches it (at step 7) at gateway cache 608. The gateway node 604 executes the plugins for the request and the response (e.g., by proxy the request to API 612 at step 7), and at step 8, the gateway node 604 returns a final response to the client.

Dynamic Execution Order

The above embodiments describe the installation of plugins on a gateway node or API gateway. Absent other intervention, those plugins are executed upon request (e.g., by an API/microservice) or by chance based on when the processor of the API gateway picks up and executes instructions. In some cases, two plugins execute in parallel, and create programmatic race conditions that lead to inefficient application execution. The execution of those plugins is thus uncontrolled and potentially problematic. Operations that execute out of order or in the wrong conditions become problematic to a program flow and cause error/crash/slowdown states.

A cause of the program flow issue is that when the plugins are migrated from the individual microservices to the API gateway, the body executing the plugins is not specifically the body that needs the result of the plugins. While the gateway continues to operate correctly, the microservices that rely on the output of the plugins do not operate correctly.

Typically, execution is controlled by the executing processor. However, an API gateway that included installed plugins is not necessarily going to be configured for the plugins that are installed thereon. It is very difficult to pre-configure an API gateway for every possible combination of plugins installed thereon, for every application purpose of a given service group of microservices or individual microservice.

A solution is to configure execution ordering and condition decisions in native instructions within each plugin. Further, to configure the API gateway to take into account the individual instructions of the installed plugin when executing the plugins.

Where a set of plugins are installed on the API gateway, the gateway receives input from each of the plugins via plugin native instructions. The plugin native instructions indicate a preference of execution order and/or a preference of execution conditions. The API gateway then reorders the order of execution of the plugins based on the preference of execution order in plugin native instructions. In some embodiments, the execution order includes delaying execution of respective plugins on the API gateway until a preference of execution conditions is met.

Examples of native instructions include executing before or after resolution of a specific plugin, executing before or after all other plugins, or executing before or after a specific functional group of plugins executes. In some embodiments, a result of a first plugin is provided to a second plugin as input. In such examples, the first plugin is ordered before the second plugin in execution order, so the result of the first plugin is available.

In still other examples, plugin native instructions indicate specific conditions for execution. A given plugin requests that the API gateway wait for a threshold number of requests before executing in order to take advantage of batch processing.

In some configurations, a given API/microservice will send a request to the API gateway that involves execution of a subset of the installed plugins. The above examples described predetermined execution order scenarios, but when a given API has requested a subset of plugins, that subset may be one of numerous combinations that cannot be feasibly predetermined. In such circumstances, the execution order is dynamically reordered in real-time based on the plugins within the subset.

In a microservices architecture, each microservice typically exposes a set of what are typically fine-grained endpoints, as opposed to a monolithic application where there is just one set of (typically replicated, load-balanced) endpoints. An endpoint can be considered to be a URL pattern used to communicate with an API.

Figure 7:
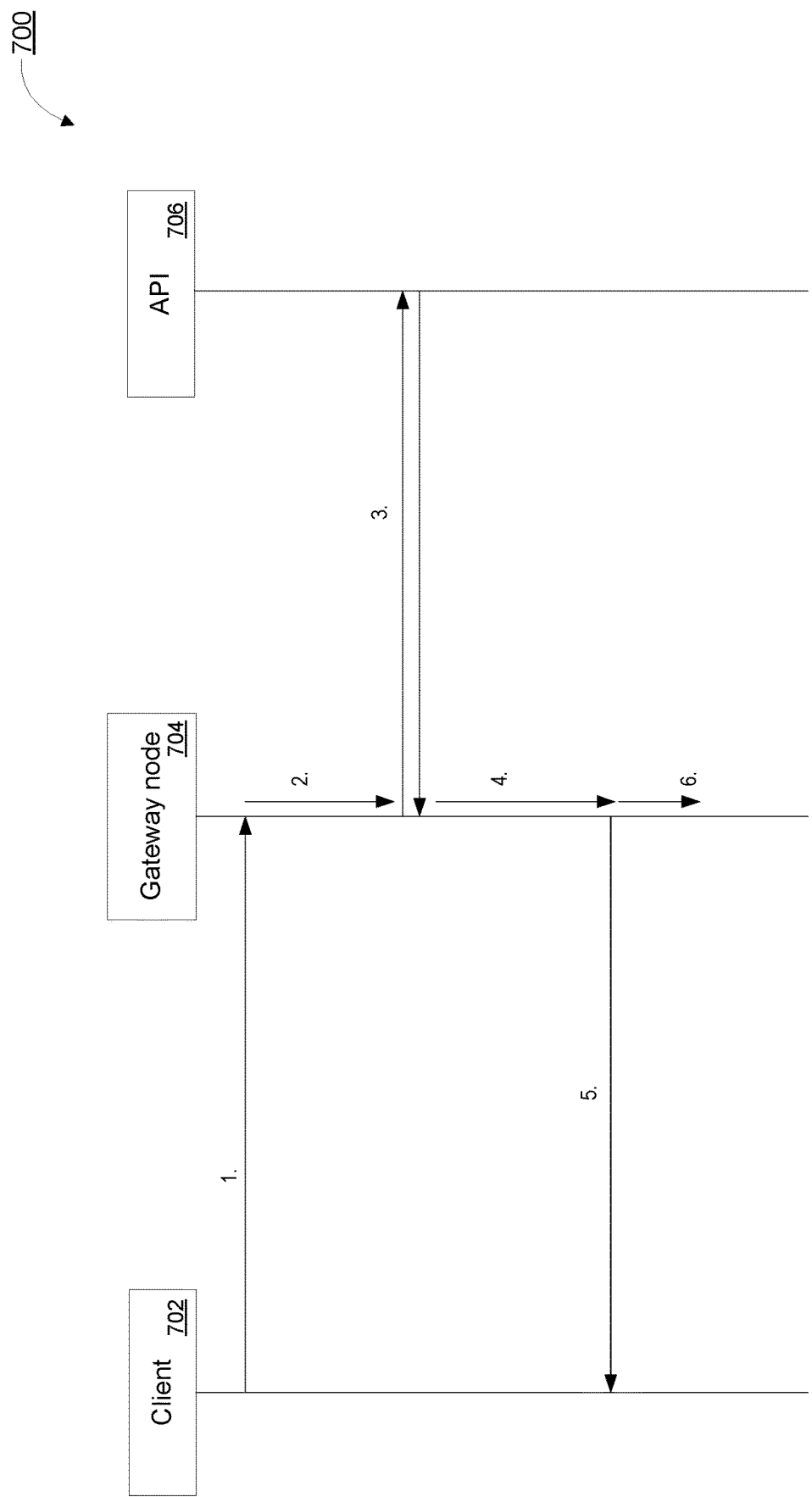
FIG. 7 illustrates a sequence diagram of a use-case showing components and associated steps involved in generating auto-documentation, according to an embodiment of the disclosed technology.

FIG. 7 illustrates a sequence diagram 700 of a use-case showing components and associated steps involved in executing plugins, according to an embodiment of the disclosed technology. The components involved in the interaction are a client 702, an API gateway 704, and an API 706. At step 1, a client 702 makes a request to gateway node 704. At step 2, the gateway node 704 parses the request and identifies an endpoint API or API service group that the request is associated with. (The request can be considered as one part of a complete request/response transaction).

At step 3, the gateway node 704 proxies/load-balances the request to API 706, which returns a response. The API response includes a set of plugin execution requests. At step 4, the gateway node 704 determines an execution order for the plugin execution requests based on the native plugin instructions of the plugins that were requested by the API 706. Once the execution order is determined in step 5, the gateway executes the plugins in the determined order. At step 6, the gateway node 704 provides the plugin result back to the API 706 and the API 706 provides the response to the client 702. At step 7, the API gateway 704 forwards the API output to the client 702.

Figure 8:
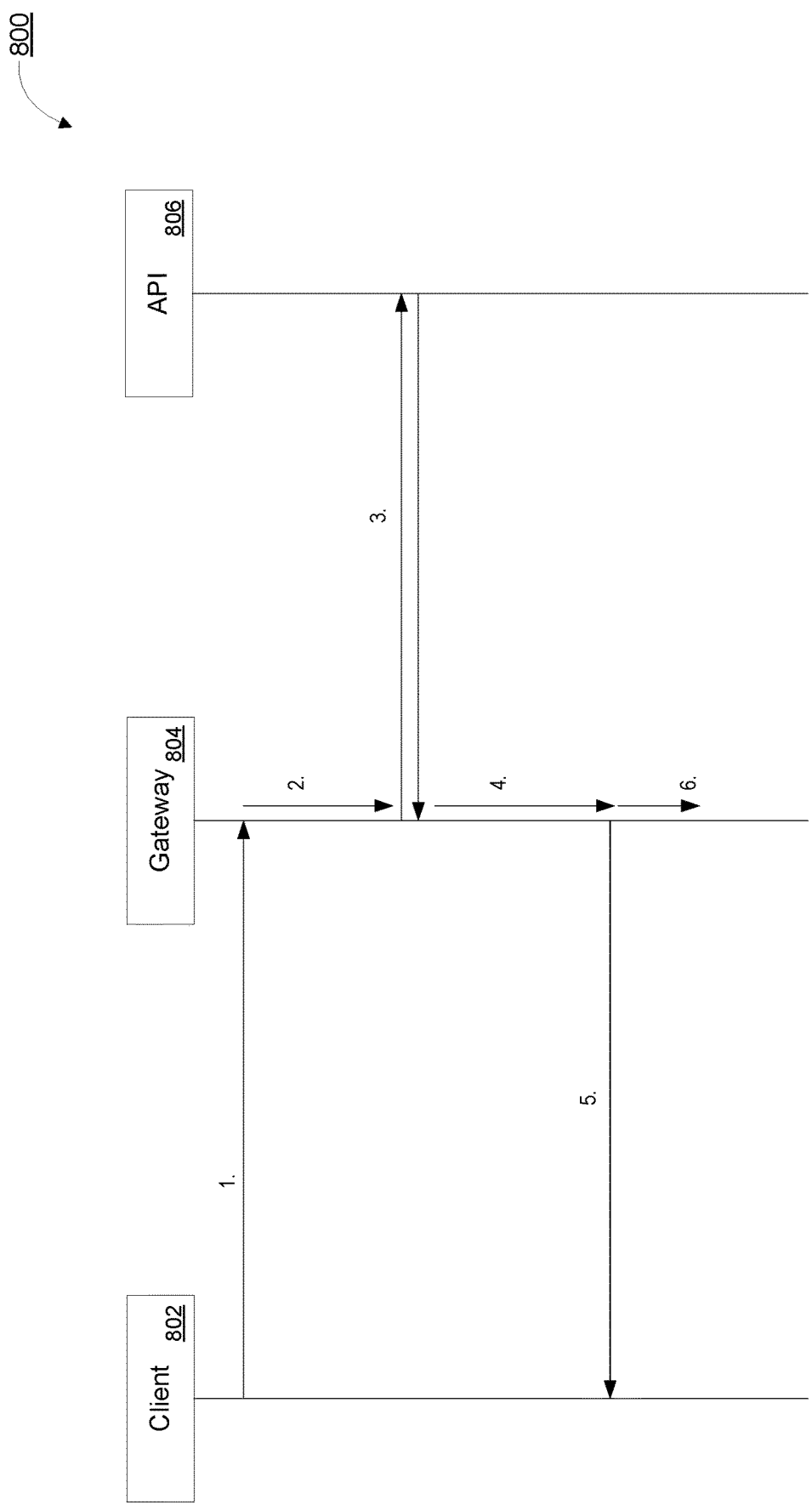
FIG. 8 illustrates a sequence diagram of another use-case showing components and associated steps involved in generating auto-documentation according to an embodiment of the disclosed technology.

FIG. 8 illustrates a sequence diagram of another use-case showing components and associated steps involved in determining execution conditions, according to an embodiment of the disclosed technology. Specifically, FIG. 8 corresponds to the use-case when the execution order is determined by an application state. The execution of the plugins may not be in response to any specific request by an API 806, but rather an application state (e.g., a time since last reset, traffic thresholds, processing capacity, etc.). Based on application state conditions, the execution of plugins is configured/reordered in a configurable fashion as dictated by plugin native instructions.

At step 1, the API gateway 804 identifies an application state. The figure illustrates the identification based on client 802 interaction, though a number of potential triggers exist (e.g., an API 806 may indicate a given application state). At step 2, the gateway node 804 evaluates the native instructions of installed plugins and executes those functionalities as instructed. At step 3, the gateway node 804 provides the output of the plugins to the relevant API 806, which returns a response.

In some embodiments, at step 4, the gateway node 804 is configured to reevaluate an application state based on the operation of the APIs 806. At step 5, the gateway node 804 responds to the client 802.

Figure 9:
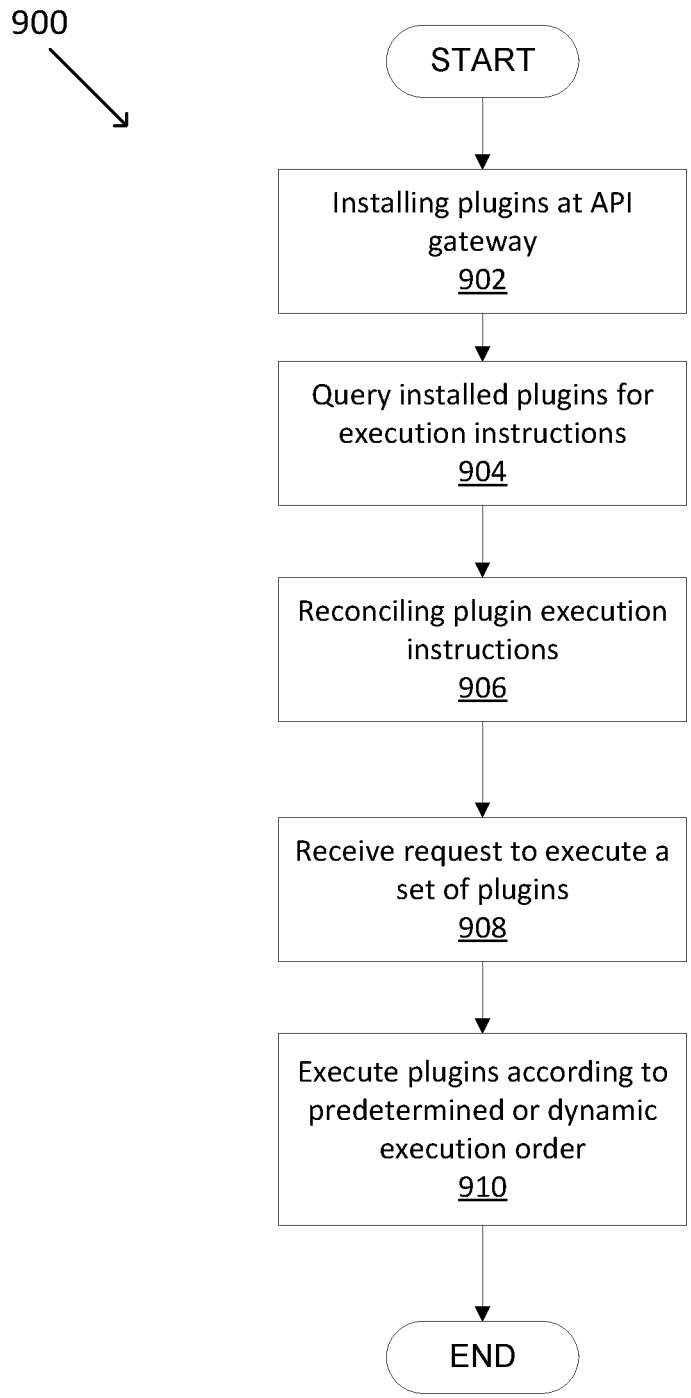
FIG. 9 illustrates a flow diagram showing steps involved in evaluating plugin native instructions at a gateway node, according to an embodiment of the disclosed technology.

FIG. 9 illustrates a flow diagram 900 showing steps involved in evaluating plugin native instructions at a gateway node, according to an embodiment of the disclosed technology. In step 902, a set of plugins are installed at the gateway node. The installation is performed as described above. In step 904, the API gateway queries each installed plugin for execution instructions. In step 906, the API gateway receives and reconciles native instructions from the plugins. Reconciliation of the plugin native instructions includes assembling an execution order that complies with the native instructions.

Examples of native instructions on the plugins include execution preference relative to other specific plugins, the overall execution order, other specific functional elements, other plugins included in a specific request, application state, and/or gateway state.

Reordering of the plugins is configurable as either a number of preset execution orders, or dynamically determined upon each request of the gateway node.

In step 908, the gateway node receives a request to execute a set of plugins. In step 910, the gateway node executes those plugins according to the predetermined or dynamically determined execution order.

Figure 10:
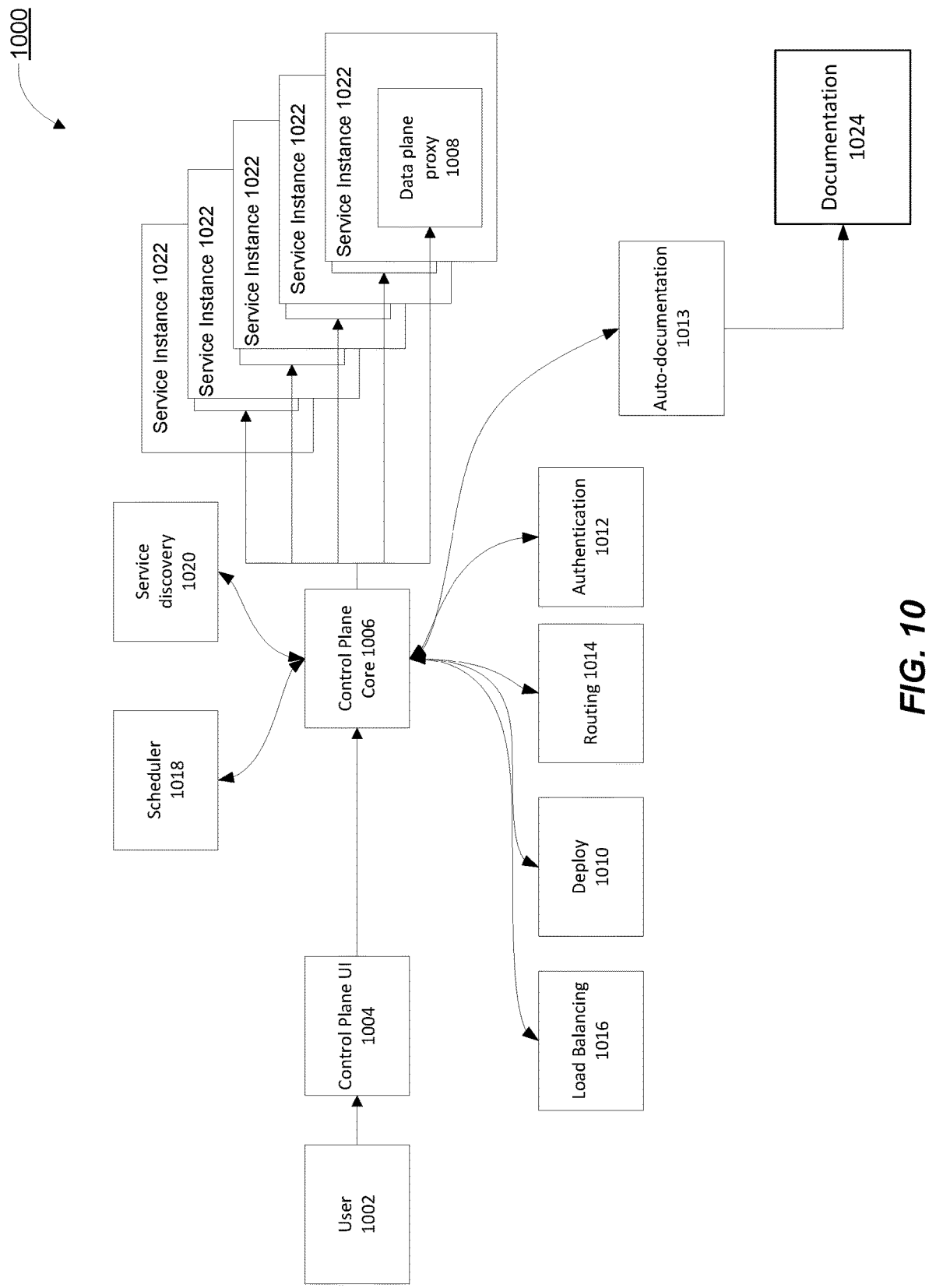
FIG. 10 is a block diagram of a control plane system for a service mesh in a microservices architecture.

FIG. 10 is a block diagram of a control plane system 1000 for a service mesh in a microservices architecture. A service mesh data plane is controlled by a control plane. In a microservices architecture, each microservice typically exposes a set of what are typically fine-grained endpoints, as opposed to a monolithic application where there is just one set of (typically replicated, load-balanced) endpoints. An endpoint can be considered to be a URL pattern used to communicate with an API.

Service mesh data plane: Touches every packet/request in the system. Responsible for service discovery, health checking, routing, load balancing, authentication/authorization, and observability.

Service mesh control plane: Provides policy and configuration for all of the running data planes in the mesh. Does not touch any packets/requests in the system but collects the packets in the system. The control plane turns all the data planes into a distributed system.

A service mesh such as Linkerd, NGINX, HAProxy, or Envoy co-locate service instances with a data plane proxy network proxy. Network traffic (HTTP, REST, gRPC, Redis, etc.) from an individual service instance flows via its local data plane proxy to the appropriate destination. Thus, the service instance is not aware of the network at large and only knows about its local proxy. In effect, the distributed system network has been abstracted away from the service programmer. In a service mesh, the data plane proxy performs a number of tasks. Example tasks disclosed herein include service discovery, update discovery, health checking, routing, load balancing, authentication and authorization, and observability.

Service discovery identifies each of the upstream/backend microservice instances used by the relevant application. Health checking refers to detection of whether upstream service instances returned by service discovery are ready to accept network traffic. The detection may include both active (e.g., out-of-band pings to an endpoint) and passive (e.g., using three consecutive 5xx as an indication of an unhealthy state) health checking. The service mesh is further configured to route requests from local service instances to desired upstream service clusters.

Load balancing: Once an upstream service cluster has been selected during routing, a service mesh is configured to load balance. Load balancing includes determining to which upstream service instance should the request be sent; with what timeout; with what circuit breaking settings; and if the request fails, should it be retried?

The service mesh further authenticates and authorizes incoming requests cryptographically using mTLS or some other mechanism. Data plane proxies enable observability features including detailed statistics and logging, and distributed tracing data should be generated so that operators can understand distributed traffic flow and debug problems as they occur.

In effect, the data plane proxy is the data plane. Said another way, the data plane is responsible for conditionally translating, forwarding, and observing every network packet that flows to and from a service instance.

The network abstraction that the data plane proxy provides does not inherently include instructions or built-in methods to control the associated service instances in any of the ways described above. The control features are enabled by a control plane. The control plane takes a set of isolated stateless data plane proxies and turns them into a distributed system.

A service mesh and control plane system 1000 includes a user 1002 who interfaces with a control plane UI 1004. The UI 1004 might be a web portal, a command line interface, or some other interface. Through the UI 1004, the user 1002 has access to the control plane core 1006. The control plane core 1006 serves as a central point that other control plane services operate through in connection with the data plane proxies 1008. Ultimately, the goal of a control plane is to set policy that will eventually be enacted by the data plane. More advanced control planes will abstract more of the system from the operator and require less handholding.

Control plane services may include global system configuration settings, such as deploy control 1010 (blue/green and/or traffic shifting), authentication and authorization settings 1012, route table specification 1014 (e.g., when service A requests a command, what happens), load balancer settings 1016 (e.g., timeouts, retries, circuit breakers, etc.), a workload scheduler 1018, and a service discovery system 1020. The scheduler 1018 is responsible for bootstrapping a service along with its data plane proxy 1018.

Services 1022 are run on an infrastructure via some type of scheduling system (e.g., Kubernetes or Nomad). Typical control planes operate in control of control plane services 1010-1020 that in turn control the data plane proxies 1008. Thus, in typical examples, the control plane services 1010-1020 are intermediaries to the services 1022 and associated data plane proxies 1008. An auto-documentation unit 1023 is responsible for parsing copied packets originating from the data plane proxies 1008 and associated with each service instance 1022. Data plane proxies 1008 catch requests and responses that are delivered in between services 1022 in addition to those responses and requests that originate from outside of the microservices architecture (e.g., from external clients).

The auto-documentation unit 1023 updates documentation 1024 relevant to the associated service instances 1022 as identified by the auto-documentation unit 1023. Documentation 1024 may be present in source code for the services 1022 or in a separate document.

As depicted in FIG. 10, the control plane core 1006 is the intermediary between the control plane services 1010-1020 and the data plane proxies 1008. Acting as the intermediary, the control plane core 1006 removes dependencies that exist in other control plane systems and enables the control plane core 1006 to be platform agnostic. The control plane services 1010-1020 act as managed stores. With managed storages in a cloud deployment, scaling and maintaining the control plane core 1006 involves fewer updates. The control plane core 1006 can be split to multiple modules during implementation.

The control plane core 1006 passively monitors each service instance 1022 via the data plane proxies 1008 via live traffic. However, the control plane core 1006 may take active checks to determine the status or health of the overall application.

The control plane core 1006 supports multiple control plane services 1010-1020 at the same time by defining which one is more important through priorities. Employing a control plane core 1006 as disclosed aids control plane service 1010-1020 migration. Where a user wishes to change the control plane service provider (e.g., changing service discovery between Zookeper-based discovery to switch to Consul-based discovery), a control plane core 1006 that receives the output of the control plane services 1010-1020 from various providers can configure each regardless of provider. Conversely, a control plane that merely directs control plane services 1010-1020 includes no such configuration store.

Another feature provided by the control plane core 1006 is Static service addition. For example, a user may run Consul, but you want to add another service/instance (e.g., for debugging). The user may not want to add the additional service on the Consul cluster. Using a control plane core 1006, the user may plug the file-based source with custom definition multi-datacenter support. The user may expose the state hold in control plane core 1006 as HTTP endpoint, plug the control plane core 1006 from other datacenters as a source with lower priority. This will provide fallback for instances in the other datacenters when instances from local datacenters are unavailable.

Figure 11:
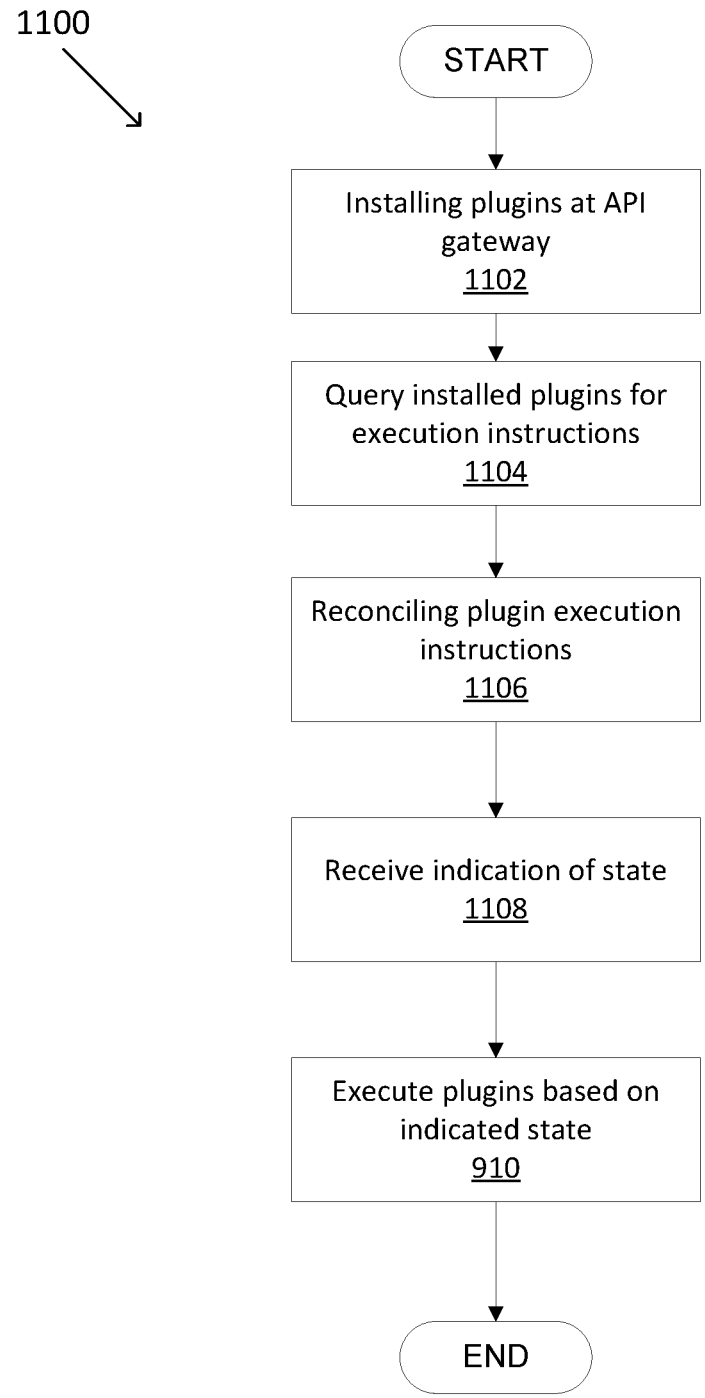
FIG. 11 illustrates a flow diagram showing steps involved in executing plugins based on application state.

FIG. 11 illustrates a flow diagram showing steps involved in executing plugins based on application state. In step 1102, a set of plugins are installed at the gateway node. The installation is performed as described above. In step 1104, the API gateway queries each installed plugin for execution instructions. In step 1106, the API gateway receives and reconciles native instructions from the plugins. Reconciliation of the plugin native instructions includes assembling an execution order that complies with the native instructions.

Examples of native instructions on the plugins include execution preference relative to other specific plugins, the overall execution order, other specific functional elements, other plugins included in a specific request, application state, and/or gateway state.

Reordering of the plugins is configurable as either a number of preset execution orders, or dynamically determined upon each request of the gateway node.

In step 1108, the gateway node receives an indication of application or gateway state. The indication is based off a message sent by a microservice functional group, a given API within the microservice application, or by monitoring state at the gateway node itself. The state of the application may also change in response to a client request received at the gateway. In step 1110, the gateway node executes plugins according to the native execution instructions based on the indicated application state.

Figure 12:
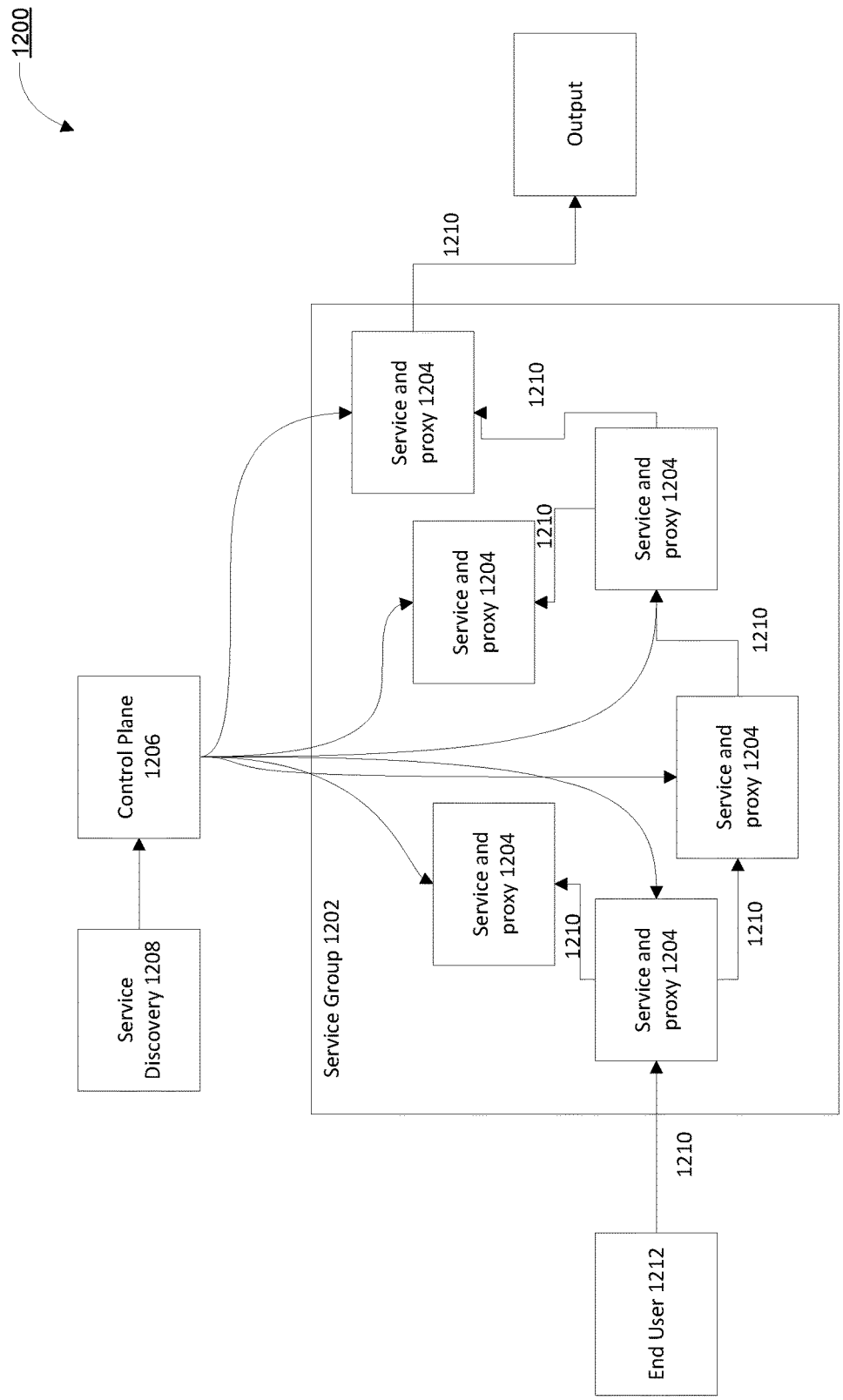
FIG. 12 is a block diagram illustrating service groups and features associated with identification thereof.
Figure 13:
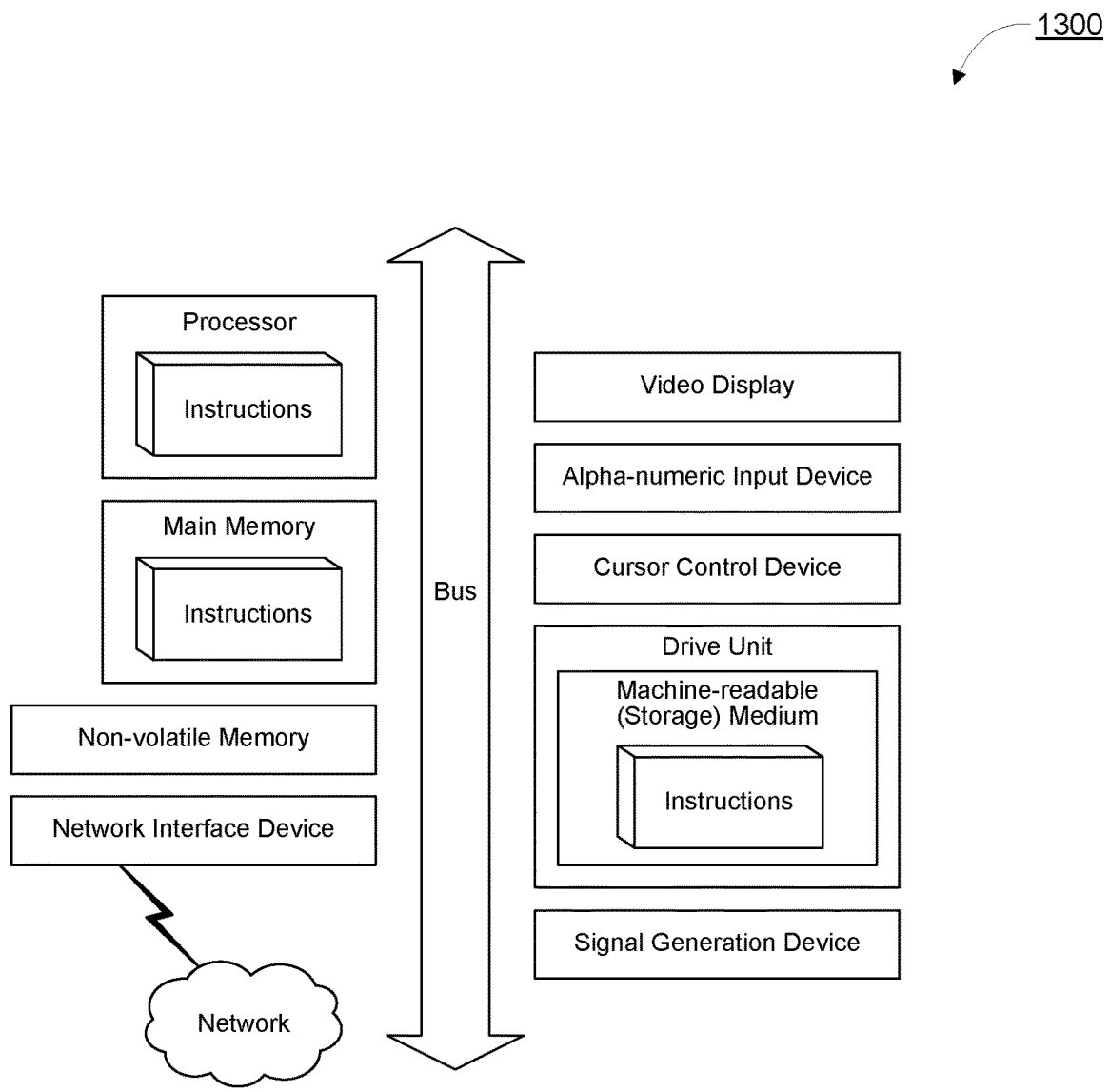
FIG. 13 depicts a diagrammatic representation of a machine in the example form of a computer system within a set of instructions, causing the machine to perform any one or more of the methodologies discussed herein, to be executed.

FIG. 12 is a block diagram illustrating service groups 1202 and features associated with identification thereof. A service group 1202 is a group of services 1204 that together perform an identifiable application purpose or business flow. For example, a set of microservices are responsible for an airline's ticketing portion of their website. Other examples may include "customer experience," "sign up," "login," "payment processing," etc. Using a control plane 1206 with an associated service discovery 1208 feature, packets are monitored as they filter through the overall application (e.g., whole website).

Given a starting point of a given service group 1202, the control plane 1206 may run a trace on packets having a known ID and follow where those packets (with the known ID) go in the microservice architecture as tracked by data plane proxies. In that way, the system can then automatically populate a service group 1202 using the trace. The trace is enabled via the shared execution path of the data plane proxies. Along each step 1210 between services 1204, the control plane 1204 measures latency and discover services. The trace may operate on live traffic corresponding to end users 1212, or alternatively using test traffic.

As output, the control plane generates a dependency graph of the given service group 1202 business flow and reports via a GUI. Using the dependency graph, a backend operator is provided insight into bottlenecks in the service group 1202. For example, in a given service group 1202, a set of services 1204 may run on multiple servers that are operated by different companies (e.g., AWS, Azure, Google Cloud, etc.). The latency between these servers may slow down the service group 1202 as a whole. Greater observability into the service group 1202 via a dependency graph enables backend operators to improve the capabilities and throughput of the service group 1202.

Exemplary Computer System

FIG. 12 shows a diagrammatic representation of a machine in the example form of a computer system 1200, within which a set of instructions for causing the machine to perform any one or more of the methodologies discussed herein may be executed.

In alternative embodiments, the machine operates as a standalone device or may be connected (networked) to other machines. In a networked deployment, the machine may operate in the capacity of a server or a client machine in a client-server network environment, or as a peer machine in a peer-to-peer (or distributed) network environment.

The machine may be a server computer, a client computer, a personal computer (PC), a tablet PC, a set-top box (STB), a PDA, a cellular telephone or smart phone, a tablet computer, a personal computer, a web appliance, a point-of-sale device, a network router, switch, or bridge, or any machine capable of executing a set of instructions (sequential or otherwise) that specify actions to be taken by that machine.

While the machine-readable (storage) medium is shown in an exemplary embodiment to be a single medium, the term "machine-readable (storage) medium" should be taken to include a single medium or multiple media (a centralized or distributed database, and/or associated caches and servers) that store the one or more sets of instructions. The term "machine-readable medium" or "machine-readable storage medium" shall also be taken to include any medium that is capable of storing, encoding or carrying a set of instructions for execution by the machine and that cause the machine to perform any one or more of the methodologies of the present invention.

In general, the routines executed to implement the embodiments of the disclosure, may be implemented as part of an operating system or a specific application, component, program, object, module, or sequence of instructions referred to as "computer programs." The computer programs typically comprise one or more instructions set at various times in various memory and storage devices in a computer, and that, when read and executed by one or more processors in a computer, cause the computer to perform operations to execute elements involving the various aspects of the disclosure.

Moreover, while embodiments have been described in the context of fully functioning computers and computer systems, those skilled in the art will appreciate that the various embodiments are capable of being distributed as a program product in a variety of forms, and that the disclosure applies equally regardless of the particular type of machine or computer-readable media used to actually effect the distribution.

Further examples of machine or computer-readable media include, but are not limited to, recordable type media such as volatile and non-volatile memory devices, floppy and other removable disks, hard disk drives, optical disks (e.g., compact disk read-only memory (CD ROMS), digital versatile discs, (DVDs), etc.), among others, and transmission type media, such as digital and analog communication links.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements; the coupling of connection between the elements can be physical, logical, or a combination thereof. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above Detailed Description of embodiments of the disclosure is not intended to be exhaustive or to limit the teachings to the precise form disclosed above. While specific embodiments of, and examples for, the disclosure are described above for illustrative purposes, various equivalent modifications are possible within the scope of the disclosure, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed in parallel, or may be performed at different times. Further, any specific numbers noted herein are only examples; alternative implementations may employ differing values or ranges.

The teachings of the disclosure provided herein can be applied to other systems, not necessarily the system described above. The elements and acts of the various embodiments described above can be combined to provide further embodiments.

All patents, applications, and references noted above, including any that may be listed in accompanying filing papers, are incorporated herein by reference. Aspects of the disclosure can be modified, if necessary, to employ the systems, functions, and concepts of the various references described above to provide yet further embodiments of the disclosure.

These and other changes can be made to the disclosure in light of the above Detailed Description. While the above description describes certain embodiments of the disclosure, and describes the best mode contemplated, no matter how detailed the above appears in text, the teachings can be practiced in many ways. Details of the system may vary considerably in its implementation details, while still being encompassed by the subject matter disclosed herein. As noted above, particular terminology used when describing certain features or aspects of the disclosure should not be taken to imply that the terminology is being redefined herein to be restricted to any specific characteristics, features, or aspects of the disclosure with which that terminology is associated. In general, the terms used in the following claims should not be construed to limit the disclosure to the specific embodiments disclosed in the specification, unless the above Detailed Description section explicitly defines such terms. Accordingly, the actual scope of the disclosure encompasses not only the disclosed embodiments, but also all equivalent ways of practicing or implementing the disclosure under the claims.

While certain aspects of the disclosure are presented below in certain claim forms, the inventors contemplate the various aspects of the disclosure in any number of claim forms. For example, while only one aspect of the disclosure is recited as a means-plus-function claim under 35 U.S.C. § 112, ¶6, other aspects may likewise be embodied as a means-plus-function claim, or in other forms, such as being embodied in a computer-readable medium. (Any claims intended to be treated under 35 U.S.C. § 112, ¶6 will begin with the words "means for.") Accordingly, the applicant reserves the right to add additional claims after filing the application to pursue such additional claim forms for other aspects of the disclosure.

The invention claimed is:

1. A method of executing plugins on a gateway, the gateway arranged between clients and a backend server, the method comprising:
   installing a plurality of plugins on the gateway, wherein the plurality of plugins collectively have an order of execution on the gateway;
   receiving, by the gateway, input from each of the plugins via plugin-native instructions, the plugin-native instructions indicate at least one of a preference of execution order or a preference of execution conditions; and
   controlling, by the gateway, the order of execution or an execution time of the plurality of plugins based on any of the preference of execution order or the preference of execution conditions in plugin native instructions.

2. The method of claim 1, wherein the preference of execution indicated by a first plugin is any of:
   to execute prior to a specific second plugin;
   to execute after a specific third plugin;
   to execute before all other plugins;
   to execute after all other plugins;
   to execute before a first functional group of plugins has executed; or
   to execute after a second functional group of plugins has executed.

3. The method of claim 1, wherein a result of a first plugin is provided to a second plugin as input, wherein the first plugin is ordered before the second plugin in execution order according to any of the preference of execution order or the preference of execution conditions in plugin native instructions.

4. The method of claim 1, further comprising:
   receiving, by the gateway, a request from a first client or the backend server that includes multiple plugin calls to a subset of the plurality of plugins; and
   in real-time, reordering the subset of the plurality of plugins based on the plugins within the subset.

5. A method of executing plugins on a gateway to an application comprising:
   installing a plurality of plugins on the gateway, each plugin configured to perform an application function;
   evaluating, by the gateway, internal calls of each of the plugins that indicate a preference of execution conditions; and
   controlling, by the gateway, execution of the plugins based on the preference of execution conditions.

6. The method of claim 5, wherein the preference of execution conditions by a first plugin is any of:
   to execute after output of a second plugin is available to the gateway;
   a predetermined time since last reset;
   a predetermined application traffic threshold; or
   a predetermined available processing capacity.

7. The method of claim 5, further comprising:
   receiving, by the gateway, a request from a microservice that includes multiple plugin calls to a subset of the plurality of plugins; and
   in real-time, reordering the subset of the plurality of plugins based on the plugins within the subset.

8. The method of claim 5, wherein a result of a first plugin is provided to a second plugin as input, wherein the first plugin is ordered before the second plugin in execution order.

9. The method of claim 5, further comprising:
   receiving, by the gateway, an indication of a current state of the application; and
   reordering an order of execution, by the gateway of the plugins based on the current state of the application.

10. The method of claim 5, wherein said controlling comprises:
    delaying execution of a first plugin on the gateway until the preferred execution condition is met.

11. The method of claim 5, wherein said controlling comprises:
    modifying, by the gateway, a state of the gateway to match the preferred execution condition; and
    in response to said modifying, executing a first plugin on the gateway.

12. The method of claim 5, wherein said evaluating internal calls of each of the plugins includes any of:
    parsing plugin code to identify objects used and seek matching objects in other plugins; or
    executing plugin native instructions.

13. A system of executing plugins on a gateway to an application comprising:
    a gateway including a memory with a plurality of plugins installed thereon, wherein application endpoints are communicatively connected to the gateway, the memory of the gateway including instructions that when executed cause the gateway to:
    receiving a set of plugin-native data of the plurality of plugins, the plugin-native data indicates at least one of a preference of execution order or a preference of execution conditions; and
    control the order of execution or an execution time of the plurality of plugins based on any of the preference of execution order or the preference of execution conditions in plugin native instructions.

14. The system of claim 13, wherein the preference of execution indicated by a first plugin is any of:
    to execute prior to a specific second plugin;
    to execute after a specific third plugin;
    to execute before all other plugins;
    to execute after all other plugins;

to execute before a first functional group of plugins has executed; or to execute after a second functional group of plugins has executed.

15. The system of claim 13, the instructions further comprising:

receiving, by the gateway, a request from a given application endpoint that includes multiple plugin calls to a subset of the plurality of plugins; and in real-time, reordering the subset of the plurality of plugins based on the plugins within the subset.

16. The system of claim 13, wherein a result of a first plugin is provided to a second plugin as input, wherein the first plugin is ordered before the second plugin in an execution order.

17. The system of claim 13, the instructions further comprising:

receiving, by the gateway, an indication of a current state of the application; and reordering an order of execution, by the gateway of the plugins based on the current state of the application.

18. The system of claim 13, the instructions further comprising:

receiving, by the gateway, an indication from a first plugin of a preferred execution condition of the first plugin; and delaying execution of the first plugin on the gateway until the preferred execution condition is met.

19. The system of claim 13, the instructions further comprising:

receiving, by the gateway, an indication from a first plugin of a preferred execution condition of the first plugin;

modifying, by the gateway, a state of the gateway to match the preferred execution condition; and in response to said modifying, executing the first plugin on the gateway.

20. The system of claim 13, wherein said receiving the set of plugin-native data includes any of:

querying each plugin for instructions;

parsing plugin code to identify objects used and seek matching objects in other plugins; or executing plugin native instructions.

* * * * *